(12) United States Patent
Sohn et al.

(10) Patent No.: US 12,046,167 B2
(45) Date of Patent: Jul. 23, 2024

(54) APPARATUS FOR INSPECTING A DISPLAY PANEL FOR DEFECTS

(71) Applicants: Samsung Display Co., Ltd., Yongin-Si (KR); Korea Advanced Institute of Science and Technology, Daejeon (KR)

(72) Inventors: Hoon Sohn, Daejeon (KR); Sangwoo Choi, Cheonan-si (KR); Minsang Koo, Seongnam-si (KR); Sanghyuk Kwon, Seoul (KR); Eunchul Shin, Cheonan-si (KR); Woojin Jung, Hwaseong-si (KR); Jiho Park, Daejeon (KR); Soonkyu Hwang, Daejeon (KR)

(73) Assignees: SAMSUNG DISPLAY CO., LTD., Yongin-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1093 days.

(21) Appl. No.: 16/512,990

(22) Filed: Jul. 16, 2019

(65) Prior Publication Data
US 2020/0074901 A1 Mar. 5, 2020

(30) Foreign Application Priority Data
Aug. 30, 2018 (KR) ........................ 10-2018-0102513

(51) Int. Cl.
*G01N 25/72* (2006.01)
*G01N 21/17* (2006.01)
*G01N 21/95* (2006.01)
*G01N 21/956* (2006.01)
*G09G 3/00* (2006.01)

(52) U.S. Cl.
CPC .......... *G09G 3/006* (2013.01); *G01N 21/171* (2013.01); *G01N 21/95607* (2013.01); *G01N 25/72* (2013.01); *G01N 2021/95615* (2013.01)

(58) Field of Classification Search
USPC ............................................................ 374/5
See application file for complete search history.

(56) References Cited

U.S. PATENT DOCUMENTS 8,902,412 B2 12/2014 Sohn et al.
9,500,599 B2 11/2016 Mun et al.
(Continued)

FOREIGN PATENT DOCUMENTS

KR 10-1188404 10/2012
KR 10-2015-0088206 7/2015
(Continued)

*Primary Examiner* — Mikhail Itskovich
(74) *Attorney, Agent, or Firm* — F. Chau & Associates, LLC

(57) ABSTRACT

An apparatus for inspecting a display panel for defects includes a table which supports the display panel, a laser excitation unit that irradiates a non-display area of the display panel with a point laser beam, a thermal wave detecting unit that generates thermal wave images of irradiated portions of the non-display area, a driving unit, and a control unit. A groove corresponding to an edge of the display panel may be defined in a top surface of the table. A defect, such as a crack, may be detected by comparing a defect pattern obtained from the thermal wave images with a pre-registered defect pattern.

23 Claims, 13 Drawing Sheets

(56) References Cited

U.S. PATENT DOCUMENTS

| | | | |
|---|---|---|---|
| 10,198,977 B2 | 2/2019 | Seo | |
| 2010/0118912 A1* | 5/2010 | Lai | G01N 25/72 |
| | | | 374/5 |
| 2014/0210997 A1* | 7/2014 | Blanchard | G01M 11/0278 |
| | | | 348/128 |
| 2015/0204800 A1* | 7/2015 | Mun | G01J 5/0896 |
| | | | 348/126 |
| 2017/0192065 A1 | 7/2017 | Lee et al. | |
| 2017/0297095 A1* | 10/2017 | Zalameda | B33Y 50/02 |

FOREIGN PATENT DOCUMENTS

| | | |
|---|---|---|
| KR | 10-2016-0110751 | 9/2016 |
| KR | 10-2016-0116925 | 10/2016 |
| KR | 10-1722063 | 4/2017 |
| KR | 10-2017-0080764 | 7/2017 |
| KR | 10-1777152 | 9/2017 |
| KR | 10-1809504 | 12/2017 |
| KR | 10-1822963 | 1/2018 |
| KR | 10-1823002 | 1/2018 |

* cited by examiner

APPARATUS FOR INSPECTING A DISPLAY PANEL FOR DEFECTS

CROSS-REFERENCE TO RELATED APPLICATIONS

This application claims priority under 35 U.S.C. § 119 of Korean Patent Application No. 10-2018-0102513, filed on Aug. 30, 2018, in the Korean Intellectual Property Office (KIPO), the disclosure of which is incorporated by reference in its entirety herein.

1. TECHNICAL FIELD

The present disclosure herein relates to an apparatus for inspecting a display panel for defects, and more particularly, to an apparatus for inspecting a display panel for defects, which is capable of detecting a crack of the display panel.

2. DISCUSSION OF RELATED ART

Display devices, such as liquid crystal display devices, that provide a fast response speed and a wide viewing angle have been developed. However, when the display device is manufactured, a deposition process and a photolithography process may be performed numerous times. When various patterns are formed through the above-described processes, a defect such as a crack may be generated in the patterns.

SUMMARY

Exemplary embodiments of the present inventive concepts provide an apparatus for inspecting a display panel for defects, which is capable of detecting a crack of the display panel in a non-contact manner.

In an exemplary embodiment of the present inventive concepts, an apparatus for inspecting a display panel for defects includes a table configured to support a display panel. The display panel includes a display area on which a pixel is disposed and a non-display area disposed adjacent to the display area. A laser excitation unit is configured to irradiate the non-display area with a point laser beam. A thermal wave detecting unit is configured to measure a thermal wave generated from the non-display area and generate a plurality of thermal wave images of irradiated portions of the non-display area. A driving unit is configured to modify a position of the table. A control unit is configured to control an operation of each of the laser excitation unit, the thermal wave detecting unit, and the driving unit.

In an exemplary embodiment of the present inventive concepts, an apparatus for inspecting a display panel for defects includes a table configured to support a display panel. The display panel includes a display area on which a pixel is disposed and a non-display area disposed adjacent to the display area. The table includes a suction hole extending from a top surface to a bottom surface or a side surface thereof. A laser excitation unit is configured to irradiate the non-display area with a point laser beam. A thermal wave detecting unit is configured to measure a thermal wave generated from the non-display area and generate a plurality of thermal wave images of irradiated portions of the non-display area. A driving unit is configured to modify a position of the table. A suction pump is configured to suction air through the suction hole to fix the display panel to the table. A control unit is configured to control an operation of each of the laser excitation unit, the thermal wave detecting unit, the driving unit, and the suction pump.

In an exemplary embodiment of the present inventive concepts, a method for inspecting a display panel for defects includes supporting a display panel by a table, the display panel comprising a display area on which a pixel is disposed and a non-display area disposed adjacent to the display area. The non-display area is irradiated with a point laser beam by a laser excitation unit. A thermal wave generated from the non-display area is measured and a plurality of thermal wave images of irradiated portions of the non-display area is generated by a thermal wave detecting unit. A position of the table is modified by a driving unit. An operation of each of the laser excitation unit, the thermal wave detecting unit, and the driving unit is controlled by a control unit.

BRIEF DESCRIPTION OF THE DRAWINGS

The accompanying drawings are included to provide a further understanding of exemplary embodiments of the present inventive concepts, and are incorporated in and constitute a part of this specification. The drawings illustrate exemplary embodiments of the present inventive concepts and, together with the description, serve to explain principles of the inventive concepts. In the drawings.

DETAILED DESCRIPTION OF THE EXEMPLARY EMBODIMENTS

Figure 1:
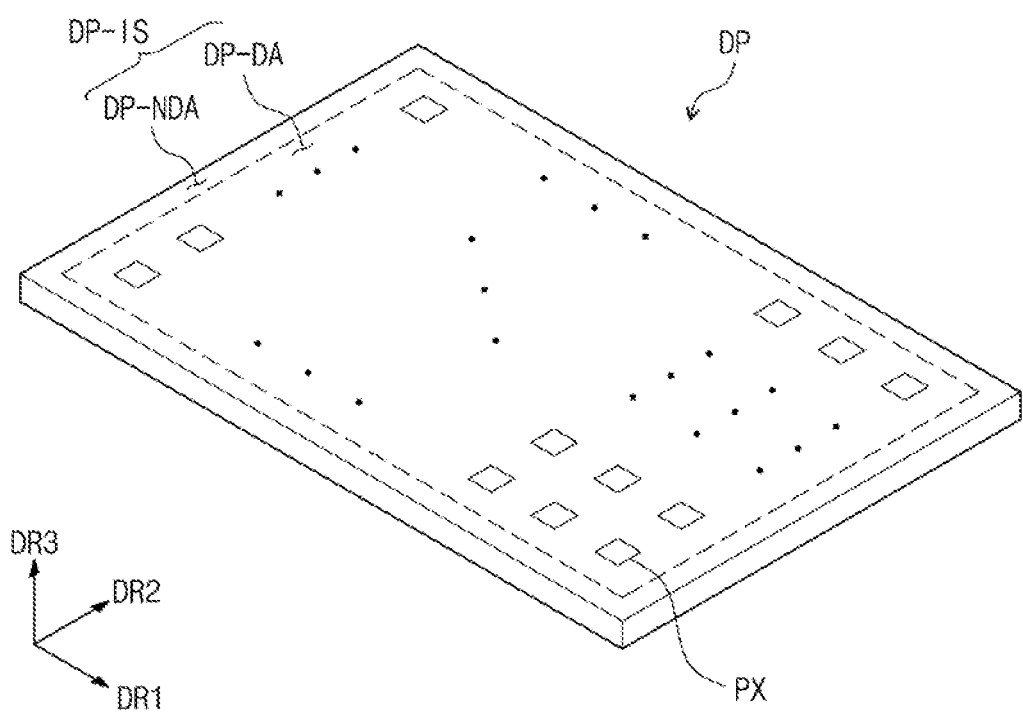
FIG. 1 is a perspective view illustrating a display panel according to an exemplary embodiment of the present inventive concepts.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the drawings, the thicknesses, ratios, and dimensions of components are exaggerated for clarity of illustration. As used herein, the term "and/or" includes any and all combinations of one or more of the associated listed items.

It will be understood that although the terms of first and second are used herein to describe various elements, these elements should not be limited by these terms. The terms are only used to distinguish one component from other components. For example, a first element referred to as a first element in one embodiment may be referred to as a second element in another embodiment. The terms of a singular form may include plural forms unless referred to the contrary.

Also, spatially relative terms, such as "below", "lower", "above", and "upper" may be used herein for ease of description to describe an element and/or a feature's relationship to another element(s) and/or feature(s) as illustrated in the drawings. The terms are relative concepts and described with respect to the direction indicated in the drawings.

The meaning of 'include' or 'comprise' specifies a property, a region, a fixed number, a step, a process, an element and/or a component but does not exclude other properties, regions, fixed numbers, steps, processes, elements and/or components. Hereinafter, exemplary embodiments of the present inventive concepts will be described with reference to the accompanying drawings.

Figure 2A:
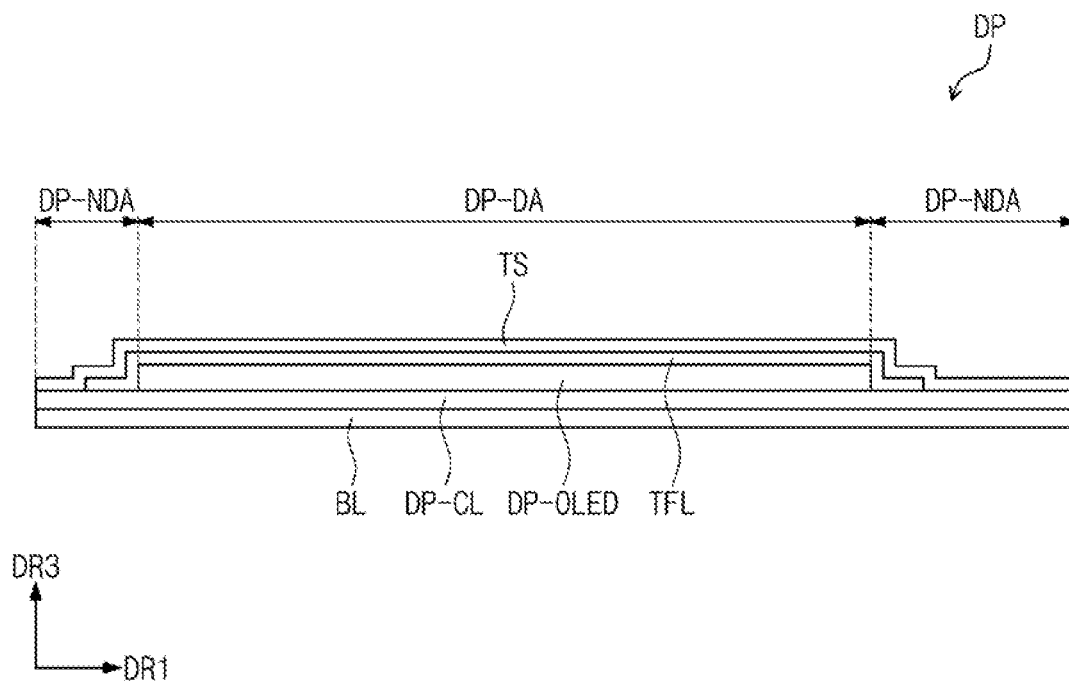
FIG. 2A is a cross-sectional view illustrating the display panel according to an exemplary embodiment of the present inventive concepts.
Figure 2B:
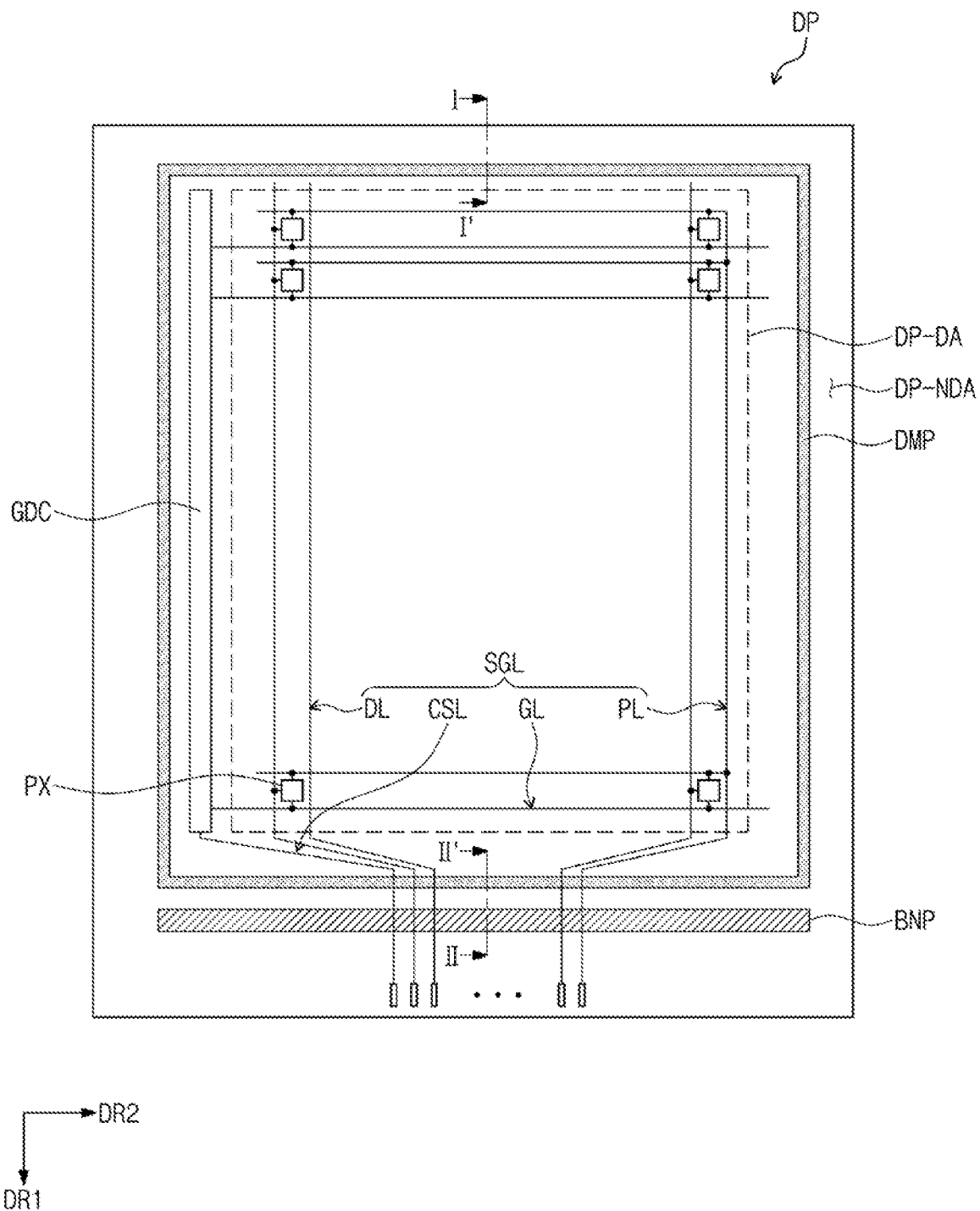
FIG. 2B is a plan view illustrating the display panel according to an exemplary embodiment of the present inventive concepts.
Figure 2C:
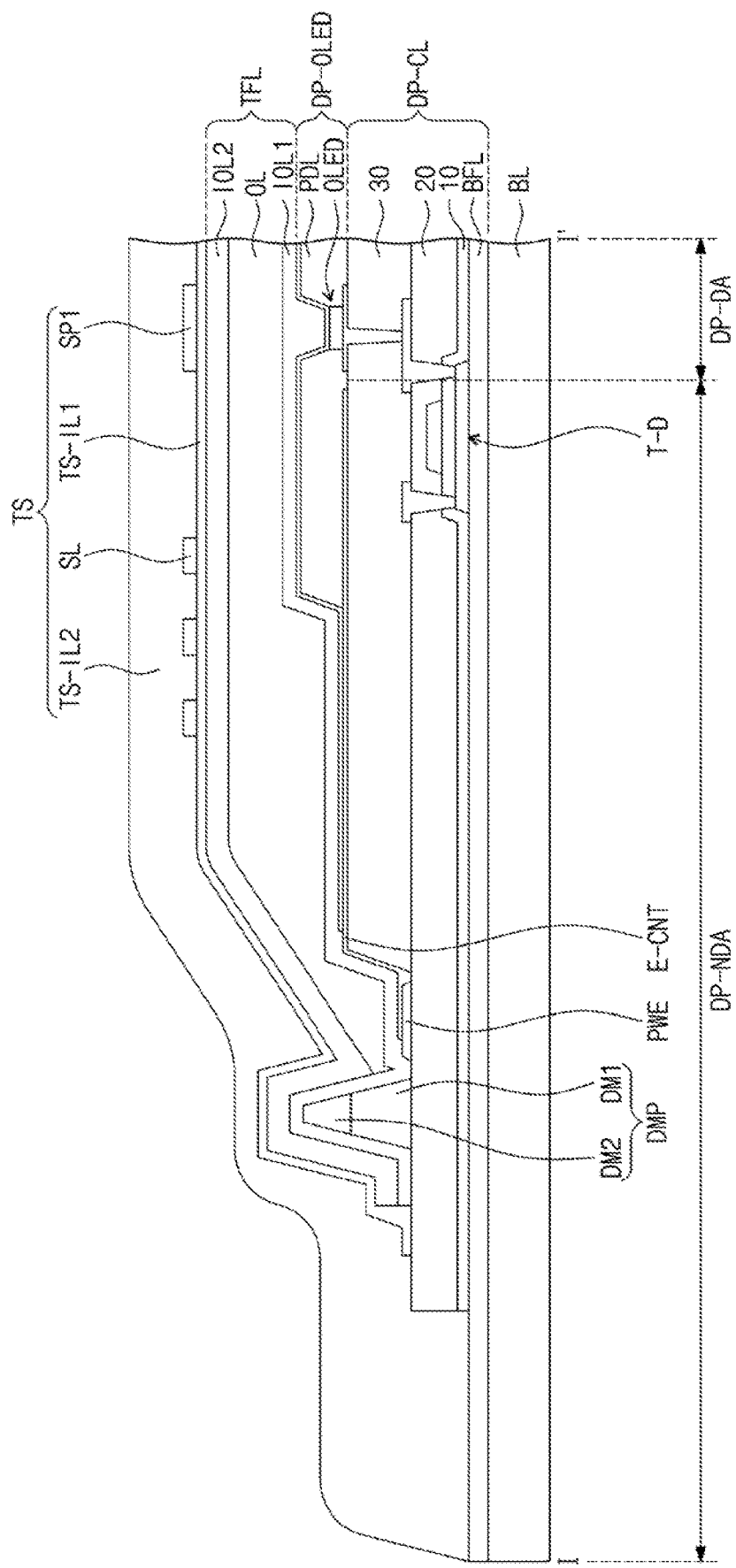
FIGS. 2C and 2D are enlarged cross-sectional views respectively taken along lines I-I' and II-II' of FIG. 2B illustrating the display panel according to exemplary embodiments of the present inventive concepts.
Figure 2D:
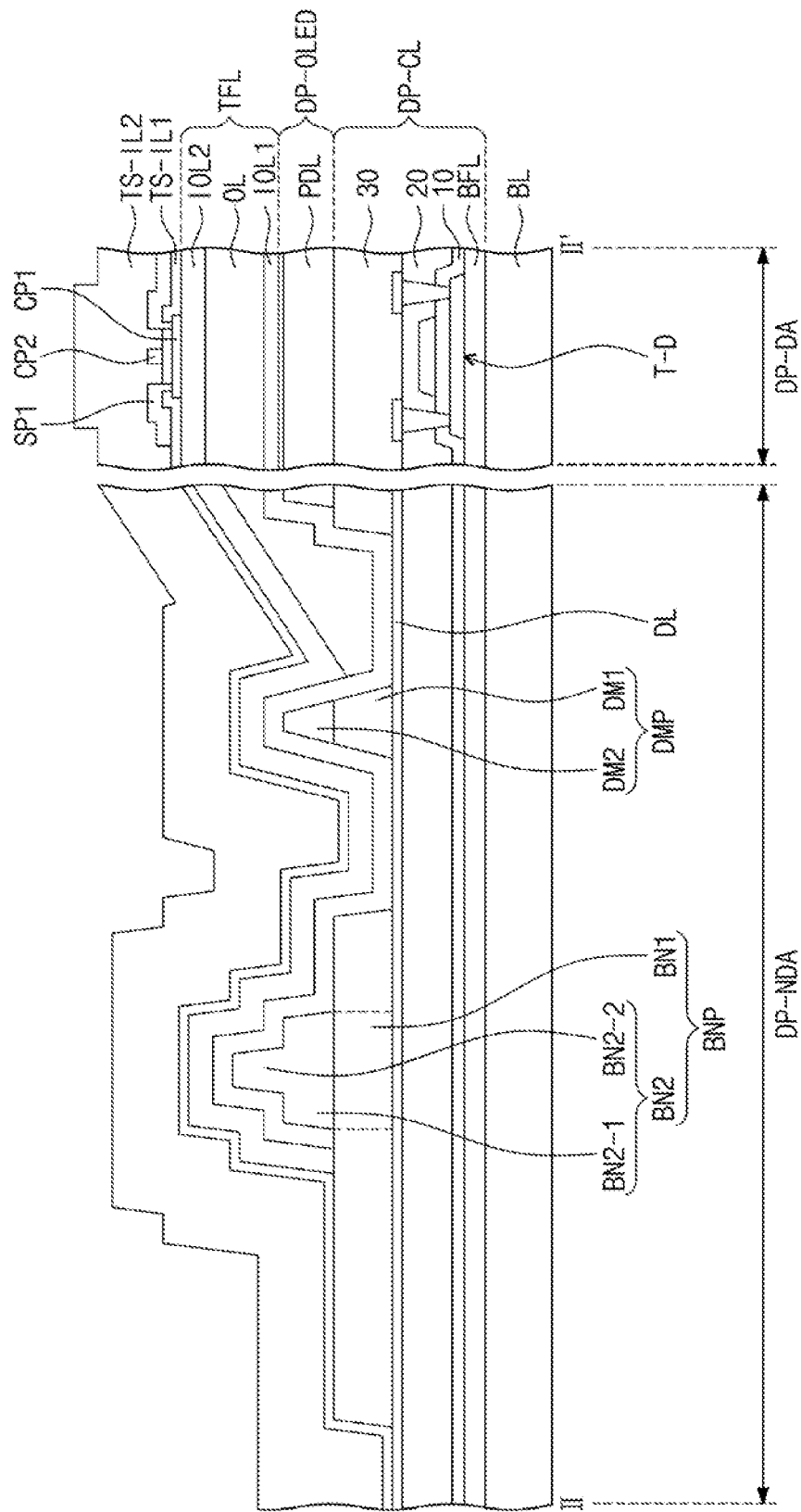

FIG. 1 is a perspective view of a display panel DP according to an exemplary embodiment of the present inventive concepts. FIG. 2A is a cross-sectional view illustrating the display panel DP according to an exemplary embodiment of the present inventive concepts. FIG. 2B is a plan view illustrating the display panel DP according to an exemplary embodiment of the present inventive concepts. FIGS. 2C and 2D are enlarged cross-sectional views respectively taken along lines I-I' and II-II' of FIG. 2B illustrating the display panel DP according to exemplary embodiments of the present inventive concepts.

As illustrated in FIG. 1, the display panel DP may be configured to display an image through a display surface DP-IS. The display surface DP-IS may be parallel to a plane defined by a first directional axis DR1 and a second directional axis DR2. A normal direction of the display surface DP-IS, i.e., a thickness direction of the display panel DP, may indicate a third directional axis DR3 that is generally perpendicular to the first directional axis DR1 and second directional axis DR2. Hereinafter, a front surface (or top surface) and a rear surface (or bottom surface) of each of the members are distinguished by the third directional axis DR3. However, the first to third directional axes DR1, DR2, and DR3 in the exemplary embodiment illustrated in FIG. 1 may be oriented differently. Hereinafter, first to third directions may be directions indicated by the first to third directional axes DR1, DR2, and DR3 and designated by the same reference numerals, respectively.

The display surface DP-IS may be divided into different areas according to whether an image is displayed. The display surface DP-IS may include a display area DP-DA on which an image is displayed and a non-display area DP-NDA disposed adjacent to the display area DP-DA.

At least one pixel PX may be disposed on the display area DP-DA. The non-display area DP-NDA may surround the display area DP-DA. However, exemplary embodiments of the present inventive concepts are not limited thereto. For example, the display area DP-DA and the non-display area DP-NDA may be relatively designed in a different shape. In other exemplary embodiments, the non-display area DP-NDA may be disposed only on areas facing in the first direction DR1.

The display panel DP according to an exemplary embodiment may be a flexible display panel. However, exemplary embodiments of the present inventive concepts are not limited thereto. For example, the display panel DP may be a rigid display panel.

As illustrated in FIG. 2A, the display panel DP may include a base layer BL, a circuit element layer DP-CL disposed on the base layer BL, a display element layer DP-OLED disposed on the circuit element layer DP-CL, and an insulation layer TFL (hereinafter, referred to as an "upper insulation layer") disposed on the display element layer DP-OLED. In an exemplary embodiment, the display panel DP may further include a touch sensing unit TS.

The base layer BL may include a synthetic resin film. A synthetic resin layer is formed on a working substrate that is used when the display panel DP is manufactured. Thereafter, a conductive layer, an insulation layer, and the like are formed on the synthetic resin layer. When the working substrate is removed, the synthetic resin layer corresponds to the base layer BL. Although the synthetic resin layer may include a polyimide-based resin layer, the exemplary embodiments of the present inventive concepts are not limited to the material of the synthetic resin layer. Additionally, the base layer BL may include a glass substrate, a metal substrate, and/or an organic/inorganic composite material substrate.

The circuit element layer DP-CL may include at least one insulation layer and a circuit element. Hereinafter, the insulation layer provided in the circuit element layer DP-CL is referred to as an intermediate insulation layer. The intermediate insulation layer may include at least one intermediate inorganic layer and/or at least one intermediate organic layer. The circuit element may include a signal line and a driving circuit of a pixel. The circuit element layer DP-CL may be formed through a process of forming an insulation layer, a semiconductor layer, and a conductive layer by coating, deposition, or the like and a process of patterning the insulation layer, the semiconductor layer, and the conductive layer by a photolithography process.

The display element layer DP-OLED may include a light emitting element. The display element layer DP-OLED may include organic light emitting diodes as the light emitting element. The display element layer DP-OLED may include a pixel defining layer, e.g., an organic material.

The upper insulation layer TFL may include a thin-film encapsulation layer for sealing the circuit element layer DP-CL, which will be described later. The upper insulation layer TFL may further include functional layers such as a capping layer, an anti-reflection layer, and a refractive index adjusting layer.

The touch sensing layer TS may be configured to acquire coordinates information of an external input. The touch sensing unit TS may be directly disposed on the organic light emitting display panel DP, particularly the upper insulation layer TFL. In the present specification, the word 'directly disposed' means that no additional adhesion layer is present and layers are formed through a continuous process.

The touch sensing unit TS may have a multilayer structure. The touch sensing unit TS may include a conductive layer having a single-layer or multi-layers. The touch sensing unit TS may include an insulation layer having a single-layer or multi-layers.

The touch sensing unit TS may be configured to detect an external input. For example, the touch sensing unit TS may detect an external input in a capacitive manner. However, exemplary embodiments of the present inventive concepts are not particularly limited to the operation method of the touch sensing unit TS. For example, the touch sensing unit TS may be configured to detect an external input by electromagnetic induction manner, pressure sensing, etc.

As illustrated in FIG. 2B, the display panel DP may include a driving circuit GDC, a plurality of signal lines SGL, and a plurality of pixels PX. In FIG. 2B, components of the touch sensing unit TS are not illustrated.

The pixels PX may be disposed on the display area DP-DA. Each of the pixels PX may include a light emitting element and a pixel driving circuit connected to the light emitting element. The driving circuit GDC, the signal lines SGL, and the pixel driving circuit may be provided in the circuit element layer DP-CL in FIG. 2A.

The driving circuit GDC may include a scan driving circuit. The scan driving circuit is configured to generate a plurality of scanning signals. The driving circuit GDC may be configured to sequentially output the scanning signals to a plurality of scanning lines GL, which will be described later. The scan driving circuit may be further configured to output another control signal to the driving circuit of each of the pixels PX.

The scan driving circuit may include a plurality of thin-film transistors that are formed through the same process as the driving circuit of each of the pixels PX, e.g., a low temperature polycrystalline silicon (LTPS) process or a low temperature polycrystalline oxide (LTPO) process.

The signal lines SGL include scanning lines GL, data lines DL, a power line PL, and a control signal line CSL. Each of the scanning lines GL may be connected to a corresponding pixel PX of the pixels PX. Each of the data lines DL may be connected to a corresponding pixel PX of the pixels PX. The power line PL may be connected to the pixels PX. The control signal line CSL may be configured to provide control signals to the scan driving circuit.

The signal lines SGL may be connected to a circuit board. The signal lines SGL may be connected to an integrated chip type timing control circuit that is mounted to the circuit board. In an exemplary embodiment of the present inventive concepts, the integrated chip may be disposed on the non-display area DP-NDA and connected to the signal lines SGL.

The display panel DP may include a dam part DMP disposed on the non-display area DP-NDA. The dam part DMP may extend along an edge of the display area DP-DA. The dam part DMP may surround the display area DP-DA. In an exemplary embodiment, the dam part DMP may be an insulation pattern.

The display panel DP may include a bank BNP. The bank BNP may be disposed on one side area of the non-display area DP-NDA and disposed outside the dam part DMP. The bank BNP may be parallel to one portion of the dam part DMP. In an exemplary embodiment, the bank BNP may be an insulation pattern. In an exemplary embodiment of the present inventive concepts, at least one of the dam part DMP and the bank BNP may be omitted.

In an exemplary embodiment, the non-display area DP-NDA may have a width of about 500 µm to about 1500 µm. The width may be measured along the second direction from each of left and right sides of the display area DP-DA. Each of the dam part DMP and the bank BNP may have a width that is spaced apart from an edge of the non-display area DP-NDA. In an exemplary embodiment, the dam part DMP may be disposed on an area that has a width of about 20% to about 60% of the width of the non-display area DP-NDA.

In an exemplary embodiment, each of the dam part DMP and the bank BNP may have a width of about 30 µm to about 200 µm, which is less than that of the non-display area DP-NDA. Although one dam part DMP and one bank BNP are illustrated in FIG. 2B, the exemplary embodiments of the present inventive concepts are not limited thereto. For example, the dam part DMP and the bank BNP may be provided in plurality.

Although the dam part DMP having a closed line shape including four linear areas on a plane is illustrated in FIG. 2B, the exemplary embodiments of the present inventive concept are not limited thereto. For example, the dam part DMP may be varied according to a shape of the display area DP-DA. The dam part DMP may have various shapes including at least one linear area.

As illustrated in the exemplary embodiments shown in FIGS. 2C and 2D, the circuit element layer DP-CL may include a buffer layer BFL that may be an inorganic layer, a first intermediate inorganic layer 10, a second intermediate inorganic layer 20, and an intermediate organic layer 30 that may be an organic layer. In FIG. 2C, a driving transistor T-D is exemplarily illustrated.

The display element layer DP-OLED may include a light emitting element. The display element layer DP-OLED may include organic light emitting diodes OLED as the light emitting element. The display element layer DP-OLED may include a pixel defining layer PDL. For example, the pixel defining layer PDL may be an organic layer.

The upper insulation layer TFL may be disposed on cathodes of the organic light emitting diodes OLED A thin-film encapsulation layer including a first encapsulation inorganic layer IOL1, an encapsulation organic layer OL, and a second encapsulation inorganic layer IOL2 is exemplarily illustrated.

The touch sensing unit TS may be disposed on the second inorganic layer IOL2. The touch sensing unit TS may include two insulation layers and two conductive layers as exemplarily illustrated. A first conductive pattern CP1 of a first conductive layer may be disposed on the second inorganic layer IOL2. The first conductive pattern CP1 may correspond to a bridge. A first touch insulation layer TS-IL1 covering the conductive pattern CP1 may be disposed on the second inorganic layer IOL2. Second conductive patterns SP1, CP2, and SL may be disposed on the first touch insulation layer TS-IL1. The second conductive patterns SP1, CP2, and SL may include a touch electrode, a signal line, and a bridge. A second touch insulation layer TS-IL2 covering the second conductive patterns SP1, CP2, and SL may be disposed on the first touch insulation layer TS-IL1. One of the first and second touch insulation layers TS-IL1 and TS-IL2 may be an inorganic layer.

A power electrode PWE that is configured to provide a power voltage may be connected to a cathode through a connecting electrode E-CNT disposed on the intermediate organic layer 30. The connecting electrode E-CNT may be formed through the same process as an anode.

As illustrated in the exemplary embodiments shown in FIGS. 2C and 2D, the dam part DMP may have a multilayer structure. A lower portion DM1 may be formed simultaneously with the intermediate organic layer 30, and an upper portion DM2 may be formed simultaneously with the pixel defining layer PDL. The dam part DMP may be configured to prevent a liquefied organic material from being spread to the outside of the intermediate inorganic layers 10 and 20 in a process of forming an encapsulation organic layer OL. The encapsulation organic layer OL may be composed of a liquefied organic material through an inkjet method on a first encapsulation inorganic layer IOL1. In exemplary embodiments, the dam part DMP may be configured to set a boundary of an area on which the liquefied organic material is disposed.

The bank BNP may have a multilayer structure. A lower portion BN1 may be formed simultaneously with the intermediate organic layer 30, and an upper portion BN2 may be formed simultaneously with the pixel defining layer PDL. In an exemplary embodiment, the upper portion BN2 may have a stepped shape including a first portion BN2-1 and a second portion BN2-2, which are integrated with each other. The second portion BN2-2 of the bank BNP may have a height that extends higher than a top surface of the dam part DMP. The bank BNP may be configured to support a mask that is used in a process of forming the encapsulation inorganic layers IOL1 and IOL2.

The stacked structure of each of the dam part DMP and the bank BNP may be varied. The dam part DMP may have a stacked structure of organic layer/inorganic layer/organic layer.

The first encapsulation inorganic layer IOL1 and the second encapsulation inorganic layer IOL2 may overlap the dam part DMP. The first encapsulation inorganic layer IOL1 and the second encapsulation inorganic layer IOL2 may also overlap the bank BNP. The first touch insulation layer TS-IL1, which is an inorganic layer, may overlap the dam part DMP and the bank BNP.

In a process of separating the display panel DP, which is described with reference to FIGS. 2A to 2D, from a working panel (not shown) including a plurality of cell areas, a crack may be generated in the dam part DMP and the bank BNP. The corresponding crack may be generated in the inorganic layer overlapping the dam part DMP and the bank BNP.

When the crack is generated, moisture may be permeated to cause a defect in the display panel DP. Accordingly, the separated display panel DP may undergo an inspection process for detecting a defect of the dam part DMP or the bank BNP. Hereinafter, a defect inspection apparatus configured to perform the inspection process will be described in detail.

Figure 3A:
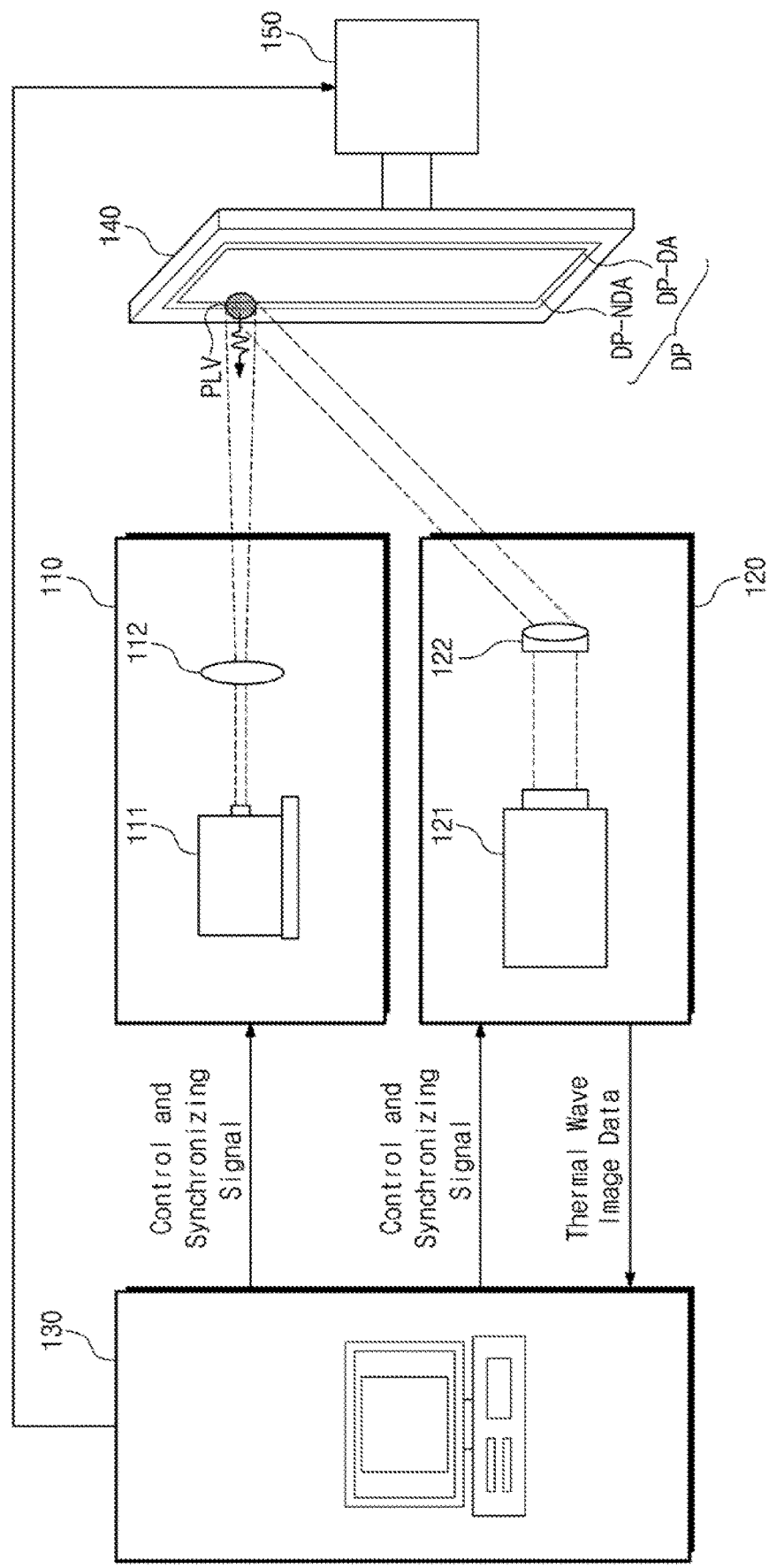
FIG. 3A is a block diagram illustrating an apparatus for inspecting a display panel for defects according to an exemplary embodiment of the present inventive concepts.
Figure 3B:
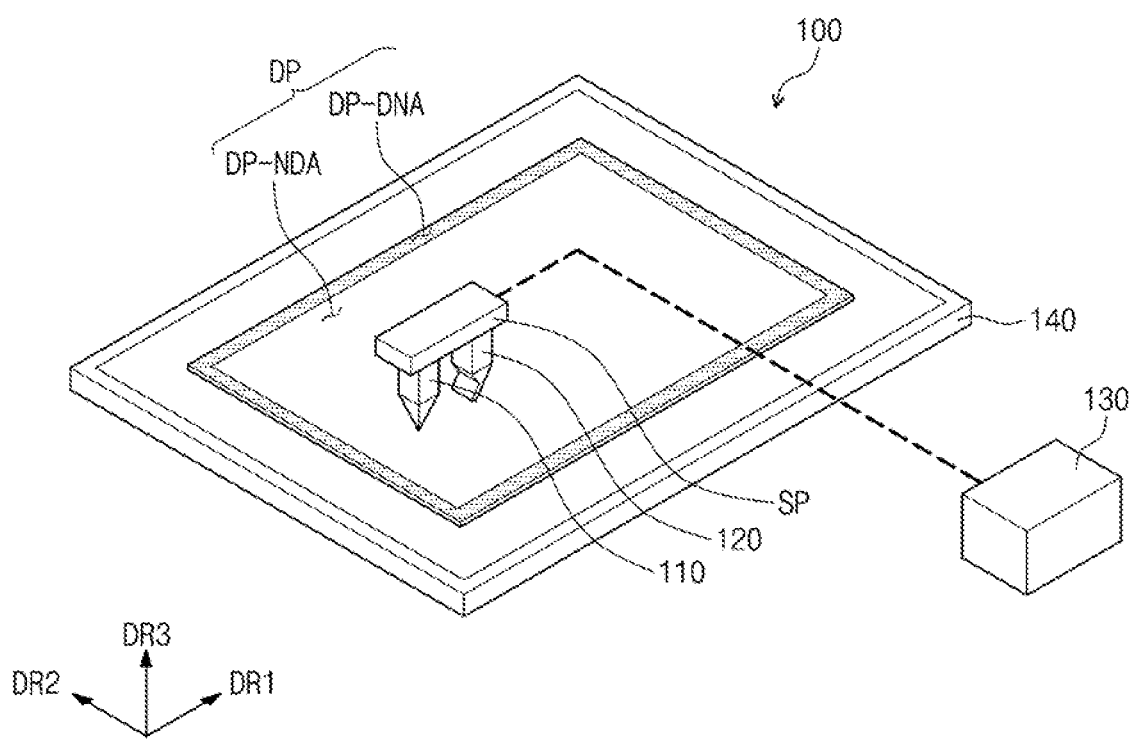
FIGS. 3B and 3C are perspective views illustrating the apparatus for inspecting the display panel for defects according to an exemplary embodiment of the present inventive concepts.
Figure 3C:
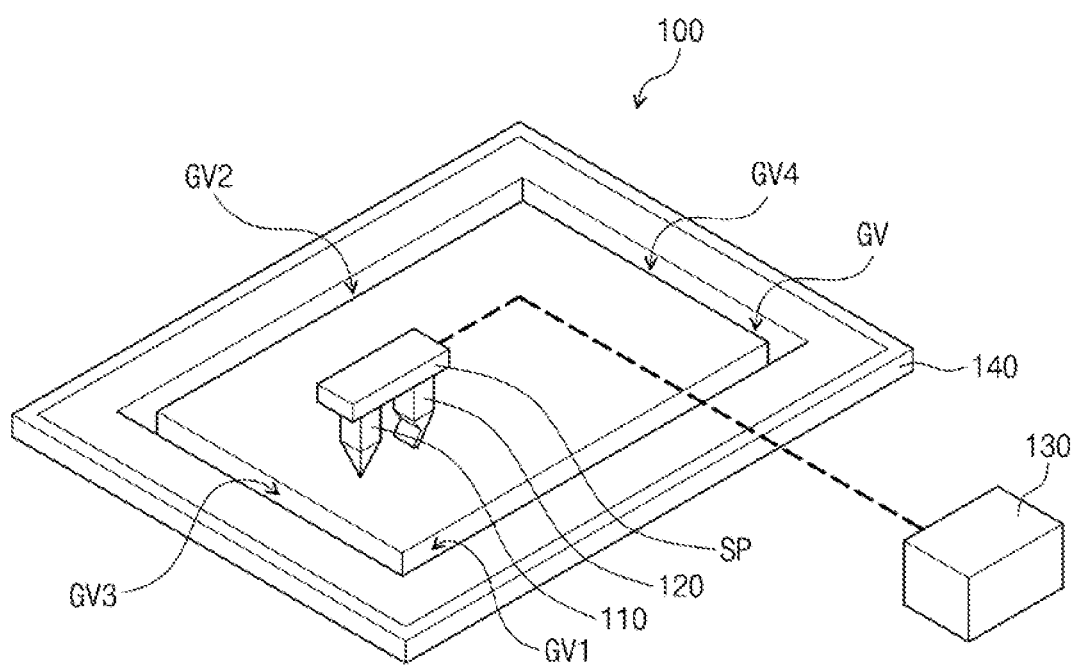
Figure 3C:
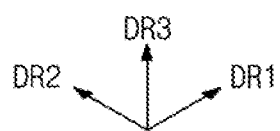
Figure 3D:
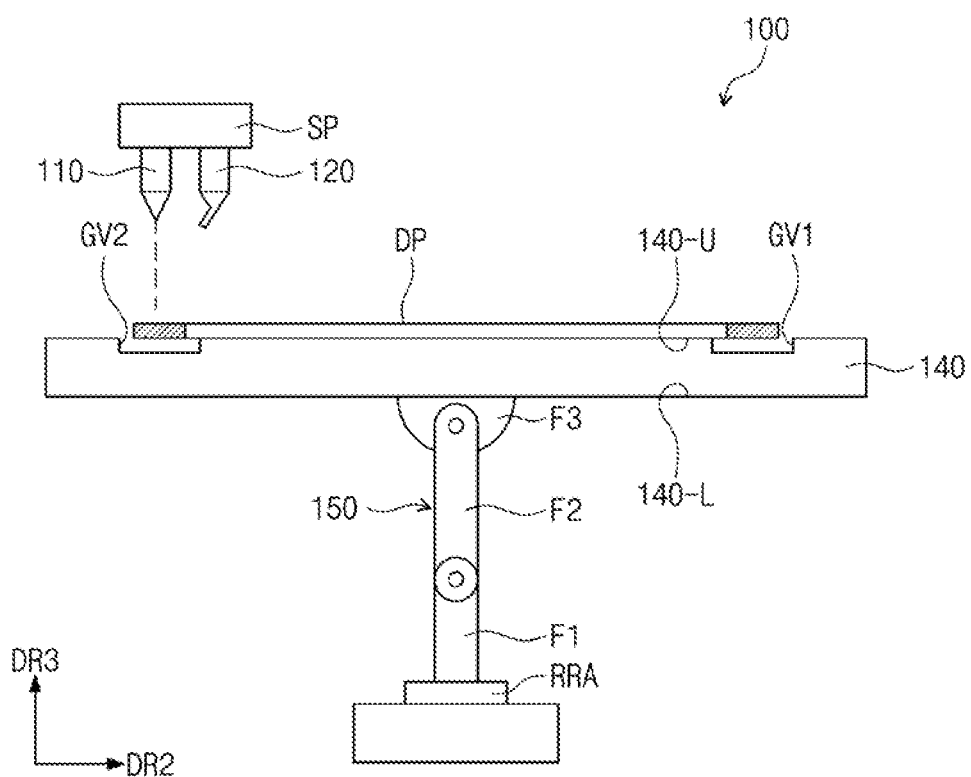
FIG. 3D is a side view illustrating the apparatus for inspecting the display panel for defects according to an exemplary embodiment of the present inventive concepts.
Figure 3E:
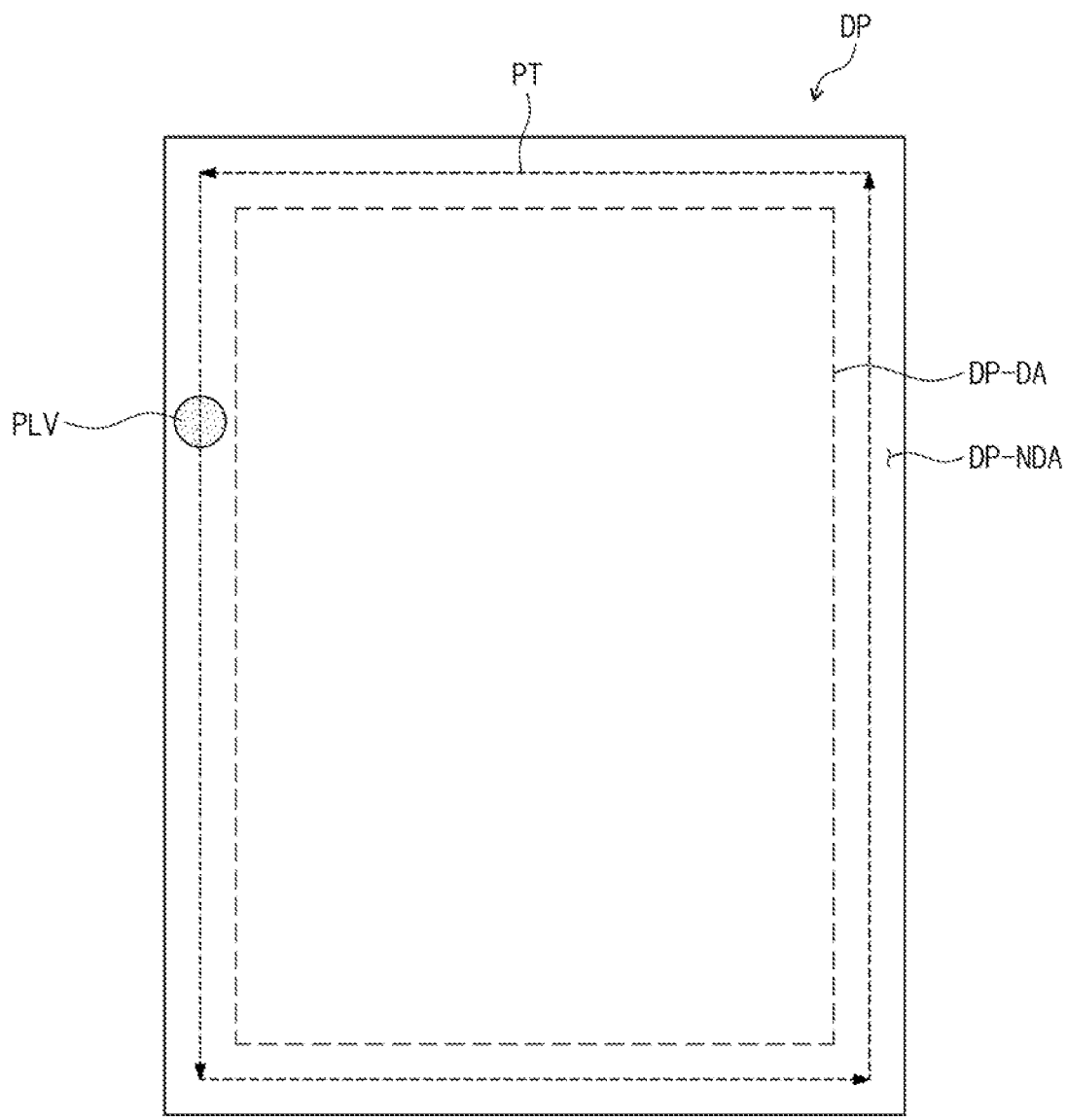
FIG. 3E is a view illustrating an operation of scanning the display panel according to an exemplary embodiment of the present inventive concepts.

FIG. 3A is a block diagram illustrating an apparatus 100 for inspecting a display panel for defects according to an exemplary embodiment of the present inventive concepts. FIGS. 3B and 3C are perspective views illustrating the defect inspection apparatus 100 for the display panel according to an exemplary embodiment of the present inventive concepts. FIG. 3D is a side view illustrating the defect inspection apparatus 100 for the display panel according to an exemplary embodiment of the present inventive concepts. FIG. 3E is a view illustrating an operation of scanning the display panel DP according to an exemplary embodiment of the present inventive concepts.

As illustrated in the exemplary embodiment shown in FIG. 3A, the defect inspection apparatus 100 may include a laser excitation unit 110, a thermal wave detecting unit 120, a control unit 130, a table 140 configured to support the display panel DP, and a driving unit 150.

The laser excitation unit 110 may be configured to excite a continuous wave point laser to the display panel DP. The laser excitation unit 110 may include a point laser emitter 111 configured to emit a point laser beam. The laser excitation unit 110 may also include a focus lens 112 that is configured to control a focus of the emitted point laser beam.

The laser excitation unit 110 may be configured to emit the point laser beam to the non-display area DP-NDA of the display panel DP. In an exemplary embodiment, the point laser beam may have a size corresponding to a width of the non-display area DP-NDA on the display panel DP. The point laser beam formed on the display panel DP may have a circular shape, a polygonal shape, etc. In an exemplary embodiment, the shape of the point laser beam formed on the display panel DP may have a diameter of about 150 μm to about 500 μm. In an exemplary embodiment, the shape of the point laser beam formed on the display panel DP may have a diameter of about 250 μm to about 350 μm. In an exemplary embodiment, the point laser beam may have a side having a length of about 150 μm to about 500 μm. In an exemplary embodiment, the point laser beam may have a diameter or a length of a side of about 250 μm to about 350 μm.

The defect inspection apparatus 100 may further include a modulation lens that is configured to modulate a continuous wave point laser beam. For example, the modulation lens may be configured to convert a continuous wave point laser beam emitted by the laser excitation unit 110 into a laser beam having various shapes such as a rectangular shape or a grid shape.

As the continuous wave point laser beam emitted from the laser excitation unit 110 is excited to the display panel DP, a thermal wave is generated from the display panel DP. The thermal wave detecting unit 120 may be configured to measure a thermal wave generated from the display panel DP. The thermal wave detecting unit 120 may be configured to generate a thermal wave image on the basis of a shape of the measured thermal wave. The thermal wave detecting unit 120 may be configured to transmit the generated thermal wave image to the control unit 130.

The thermal wave detecting unit 120 may include a thermal imaging camera 121. For example, the thermal imaging camera 121 may be an infrared measurement camera. The thermal wave detecting unit 120 may further include a macro lens 122.

The control unit 130 may be configured to control an operation of each of the laser excitation unit 110, the thermal wave detecting unit 120, and the driving unit 150. The control unit 130 may be configured to output a control and synchronizing signal to the laser excitation unit 110, the thermal wave detecting unit 120, and the driving unit 150. The control unit 130 may include a processor and a memory. For example, in an exemplary embodiment, the control unit 130 may be a computer system.

As will be described later in detail, the control unit 130 may be configured to determine whether a defect exists in the display device by obtaining a defect pattern from thermal wave image data and comparing the defect pattern with a pre-registered defect pattern. The control unit 130 may be configured to extract thermal wave information only from a potentially defected area of the surface and inside of the display panel DP and visualize the extracted information. For example, crack information of the dam part DMP and the bank BNP of the display panel DP described with reference to FIGS. 2A to 2D may be visualized. However, the control unit 130 may be configured to detect an inner crack of the dam part DMP and the bank BNP in addition to a surface crack of the dam part DMP and the bank BNP.

As illustrated in the exemplary embodiments shown in FIGS. 3B and 3D, the laser excitation unit 110 and the thermal wave detecting unit 120 may be coupled to a support SP. The support SP may be configured to fix the laser excitation unit 110 and the thermal wave detecting unit 120 at a specific position that is spaced apart from the display panel DP. Each of the laser excitation unit 110 and the thermal wave detecting unit 120 may be configured to target a specific point. The driving unit 150 may be configured to move the table 150 in response to a signal from the control unit 130.

In the exemplary embodiment shown in FIG. 3E, a scanning path PT of a point laser beam PLV is illustrated. For example, the point laser beam PLV may be configured to scan along an edge of the display panel DP. The point laser beam may scan areas on which the dam part DMP and the bank BNP are disposed as illustrated in the exemplary embodiments shown in FIGS. 2A to 2D.

The driving unit 150 may be configured to move the table 140 in a direction opposite to the scanning path PT to define a scanning path of the point laser beam PLV in FIG. 3E. Unlike the scanning path PT, the driving unit 150 may be configured to move the table 140 from a bottom side to a top side, and then from a right side to a left side. Thereafter, the driving unit 150 may be configured to move the table from the top side to the bottom side, and then from the left side to the right side.

As illustrated in the exemplary embodiment shown in FIG. 3D, the driving unit 150 may include a rotation shaft RRA and frames F1 to F3 that are connected in a joint structure. Although the driving unit 150 may have a structure that is similar to a robot arm, exemplary embodiments of the present inventive concepts are not limited thereto. For example, the driving unit 150 may be replaced by another device capable of moving the table 140, such as a rail structure, etc.

Although the support SP may be fixed and the table 140 may be configured to move in an exemplary embodiment of the present inventive concepts, exemplary embodiments of the present inventive concepts are not limited thereto. For example, a planar position of the table 140 may be fixed, and a laser beam may be irradiated to the non-display area DP-NDA of the display panel DP while the support SP is configured to move along the scanning path. As illustrated in FIGS. 3C and 3D, a groove GV may be defined in the table 140. In the exemplary embodiment shown in FIG. 3C, the groove GV is defined in correspondence to four areas of the edge of the display panel DP. The groove GV may include a first portion GV1 and a second portion GV2 each extending in the first direction DR1 and a third portion GV3 and a fourth portion GV4 each extending in the second direction DR2. The groove GV may overlap an area of the display panel DP, to which the point laser beam is irradiated. The groove GV may be configured to prevent heat formed by the point laser beam from being accumulated at a specific area of the table 140. Accordingly, the non-display area DP-NDA may be prevented from being thermally damaged by the point laser beam emitted by the laser excitation unit 110.

The groove GV may have a shape corresponding to the non-display area DP-NDA of the display panel DP. For example, the groove GV may include at least one linear area which corresponds to the linear area of the display panel DP. In an exemplary embodiment, the linear area of the groove GV may have a width of about 700 µm to about 1300 µm and a length of about 5 cm to about 30 an. However, exemplary embodiments of the present inventive concepts are not particularly limited to the length of the groove GV. The length and width of the groove GV may be determined according to the dimensions of the display panel.

In an exemplary embodiment of the present inventive concepts, one of the third portion GV3 and the fourth portion GV4 of the groove GV may not be formed. One of the third portion GV3 and the fourth portion GV4 may include a curved area which may correspond to the shape of the edge of the display panel DP.

Figure 4A:
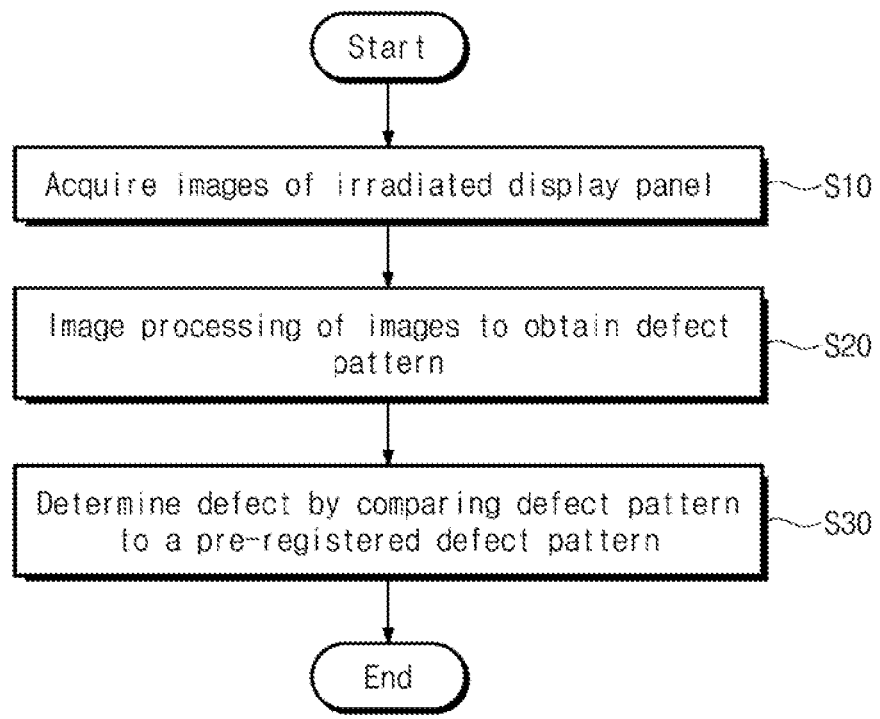
FIG. 4A is a flowchart illustrating a method for inspecting a defect of the display panel according to an exemplary embodiment of the present inventive concepts.
Figure 4B:
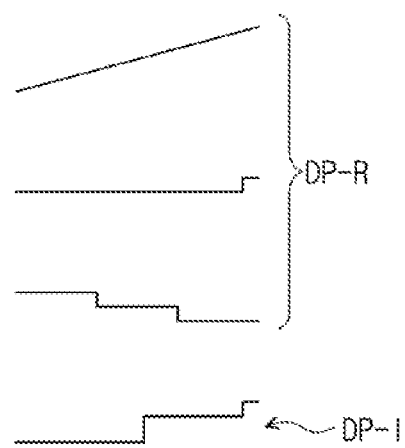
FIG. 4B is a plan view illustrating a comparison between a pre-registered defect pattern and a newly detected defect pattern according to an exemplary embodiment of the present inventive concepts.

FIG. 4A is a flowchart illustrating the method for inspecting the display panel for defects and detecting the defect that the defect inspection apparatus may be configured to perform according to an exemplary embodiment of the inventive concept. FIG. 4B is a plan view illustrating a comparison between a pre-registered defect pattern DP-R and a newly detected defect pattern DP-I.

The thermal wave detecting unit 120 may be configured to image the irradiated non-display area DP-NDA of the display panel DP in operation S10. More specifically, the laser excitation unit 110 may be configured to irradiate the non-display area DP-NDA with a point laser beam. The laser excitation unit 110 may be configured to scan the non-display area DP-NDA in a continuous manner. The control unit 130 may be configured to activate the thermal wave detecting unit 120 while being synchronized with the laser excitation unit 110. The thermal wave detecting unit 120 may be configured to measure a thermal wave generated in a portion of the non-display area DP-NDA to which the point laser beam is irradiated. The thermal imaging camera is configured to photograph (or acquire) a thermal propagation phenomenon.

As illustrated in FIG. 3E, as the point laser beam is sequentially excited along the scanning direction, the thermal wave detecting unit 120 is configured to sequentially photograph a plurality of thermal wave images. The thermal wave detecting unit 120 is configured to transmit the plurality of thermal wave images to the control unit 130. The plurality of thermal wave images may correspond to partial areas of the non-display area DP-NDA. A relationship between the thermal wave images and the areas of the non-display area DP-NDA may be determined by a scanning speed of the thermal wave detecting unit 120.

Thereafter, the control unit 130 may be configured to perform an image processing of the plurality of thermal wave images in operation S20 to generate an abnormal area image from the thermal images and obtain at least one defect pattern. A crack of the dam part DMP and the bank BNP may be regarded as an empty space. The area in which a crack is generated has a thermal conductivity that is much lower than that of areas that are not cracked. Accordingly, when the point laser beam is spread in a thickness direction of the dam part DMP and the bank BNP, the crack area has a temperature that is much higher than the areas that are not cracked. Such a thermal variation may be detected by the control unit 130 when analyzing the thermal images. The control unit 130 is configured to extract areas of the thermal wave images having thermal variations from the other areas as a potentially defected area. The control unit 130 is configured to extract the thermal propagation phenomenon occurring in the potentially defected area and generate an abnormal thermal wave image.

The abnormal thermal wave image may be extracted by using various image processing methods. For example, in an exemplary embodiment, the abnormal thermal wave image for a potentially defected area may be extracted by subtracting a mean value of all thermal wave images from all of the thermal wave images.

The control unit 130 may be configured to compress the extracted plurality of abnormal thermal wave images into an abnormal area image. The control unit 130 may be configured to compress the plurality of abnormal thermal wave images into one abnormal area image by accumulating the plurality of abnormal thermal wave images.

Thereafter, the control unit 130 may be configured to perform a noise removal process for the abnormal area image to clearly display the potentially defected area. The noise removal processing may include a binary processing. In one exemplary embodiment, the control unit 130 may be configured to divide the abnormal area image into defect patterns and a non-defect area through the binary processing. The control unit 130 may be configured to perform image noise removal filtering on the binary processed abnormal area image.

The control unit 130 may be configured to determine the existence of a defect in the potentially defected area by using the defect patterns obtained from the abnormal area image in operation S30. As illustrated in FIG. 4B, the defect pattern DP-I that is newly detected from the acquired abnormal area image is compared with a pre-registered defect pattern DP-R. For example, the pre-registered defect pattern DP-R may be a defect pattern that is stored in a memory device included in (or accessible by) the control unit 130. The control unit 130 may be configured to compare the pre-registered defect pattern DP-R to the newly detected defect pattern DP-I. For example, the control unit 130 may be configured to utilize comparative factors such as lengths, shapes, line widths, etc. when comparing the pre-registered defect pattern DP-R and the defect pattern DP-I. The control unit 130 may be configured to determine that the new defect pattern DP-I is a crack based on an overall determination of a match rate between the comparative factors. For example, in one exemplary embodiment, the defect pattern DP-I may be determined to be a crack when the patterns are matched by about 70%. However, the predetermined match rate may be another value and exemplary embodiments of the present inventive concepts are not limited thereto.

In addition, the control unit 130 may be configured to register in the memory the newly detected defect pattern DP-I as a new pre-registered defect pattern for future inspections of display panels for cracks. For example, the control unit 130 may be configured to register a new pre-registered defect pattern for future inspections if the matches between the defect pattern DP-I and the pre-registered defect pattern DP-R are equal to or above the predetermined match rate. As described above, the defect may be determined by a system without requiring a determination by an inspector. Therefore, the reliability of the detection may be enhanced by expanding the registered defect pattern.

Figure 5A:
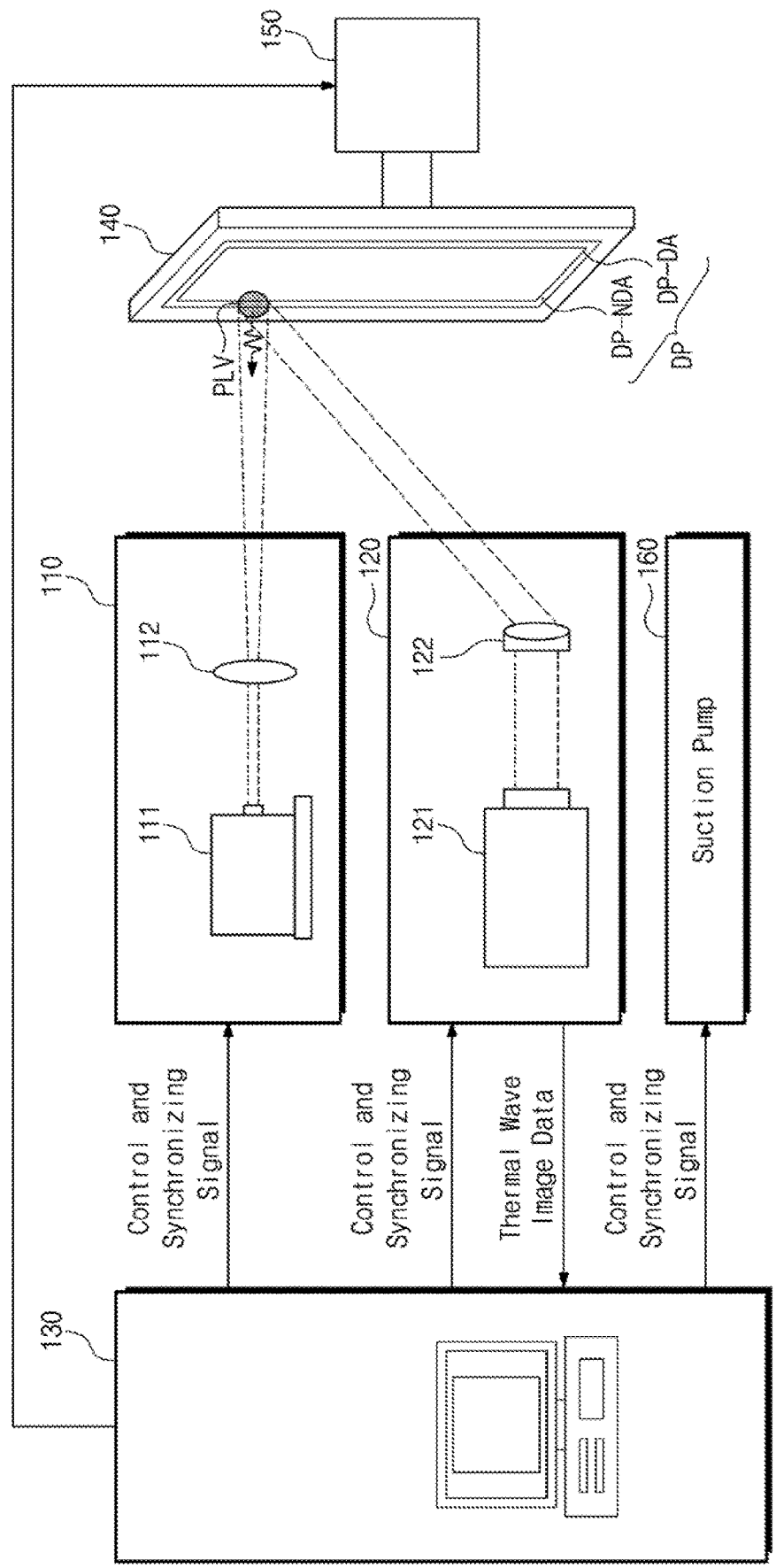
FIG. 5A is a block diagram illustrating an apparatus for inspecting the display panel for defects according to an exemplary embodiment of the present inventive concepts.
Figure 5B:
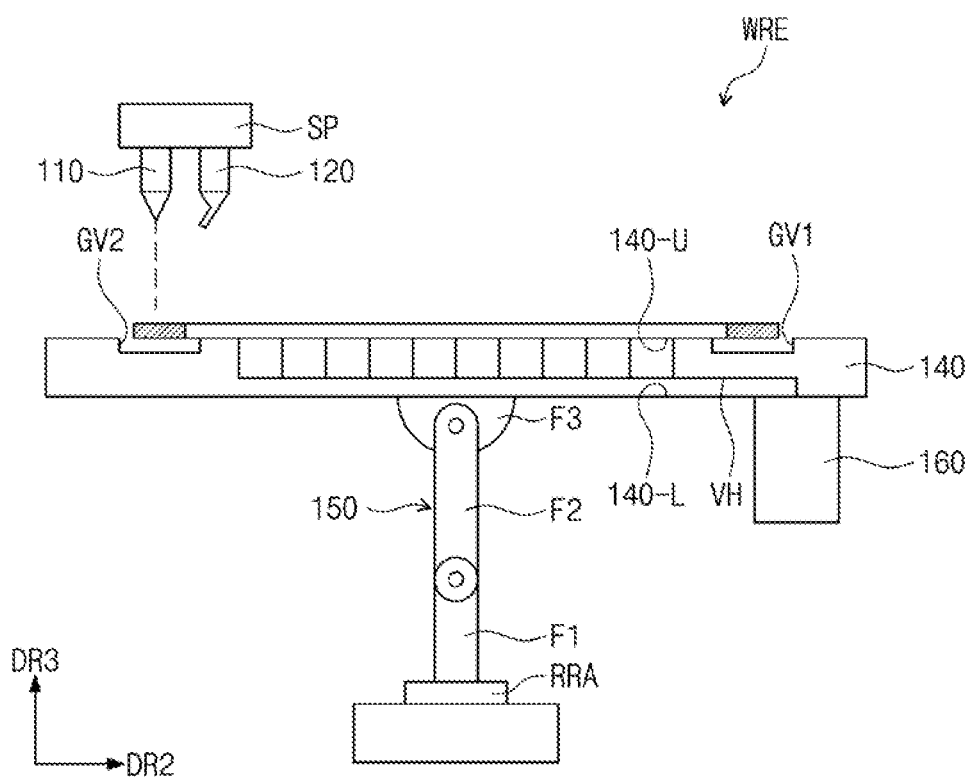
FIG. 5B is a side view illustrating the apparatus for inspecting a defect of the display panel according to an exemplary embodiment of the present inventive concepts.

FIG. 5A is a block diagram illustrating the defect inspection apparatus 100 for the display panel according to an exemplary embodiment of the present inventive concepts. FIG. 5B is a side view illustrating the defect inspection apparatus 100 for the display panel according to an exemplary embodiment of the present inventive concepts. Hereinafter, detailed description regarding the same components described with reference to FIGS. 1 to 4B will be omitted.

According to an exemplary embodiment, the defect inspection apparatus 100 may further include a suction pump 160. A suction hole VH may be defined in the table 140. The suction hole VH may extend from a top surface 140-U to a bottom surface 140-L of the table 140. The suction pump 160 may be configured to suction air through the suction hole VH to fix the display panel DP to the table 140.

A plurality of suction holes VH may be spaced apart a uniform distance from each other. The plurality of suction holes VH may be connected to each other. In an exemplary embodiment, the suction holes VH may also extend to a side surface of the table 140. Although not separately shown, the groove GV may be omitted.

As described above, as the defect inspection apparatus is used, a crack of the insulation layer stacked structure of the display panel may be detected in a non-contact method. The insulation layer stacked structure may include the dam part and the bank. As the point laser beam is emitted, a defect of the display area of the display panel, which is caused by the laser beam, may be prevented. The groove defined in the support member may prevent a defect of the non-display area of the display panel, which is caused by the laser beam.

Since the propagation direction of the thermal wave may be induced to the vertical and horizontal directions of the surface of each of the dam part and the bank through the continuous wave point laser scanning, the defect inspection apparatus may be configured to detect cracks generated in the inside as well as the surface of each of the dam part and the bank.

In another exemplary embodiment, a method for inspecting a display panel for defects is provided. The method may include the step of supporting a display panel by a table. The display panel may include a display area on which a pixel is disposed and a non-display area disposed adjacent to the display area. The non-display area may be irradiated with a point laser beam by a laser excitation unit. A thermal wave generated from the non-display area may be measured and a plurality of thermal wave images of irradiated portions of the non-display area may be generated by a thermal wave detecting unit. A position of the table may be modified by a driving unit. An operation of each of the laser excitation unit, the thermal wave detecting unit, and the driving unit may be controlled by a control unit.

In an exemplary embodiment, a defect may be detected by the control unit by comparing a match rate between at least one pre-registered first defect pattern and a second defect pattern obtained from the plurality of thermal wave images. When the match rate is equal to or greater than a predetermined reference value, the second defect pattern may be determined as a crack of the display panel.

In another exemplary embodiment, a method for detecting a defect of a display panel includes irradiating a non-display area of the display panel by a laser excitation unit. A thermal wave generated from the non-display area is measured and a plurality of thermal wave images of irradiated portions of the non-display area are generated by a thermal wave detecting unit. A defect pattern may be obtained from the plurality of thermal wave images. For example, a defect pattern may be obtained from thermal wave images that exhibit thermal variation that are extracted by a control unit. An abnormal image may be generated from the extracted thermal images and the defect patterns may be obtained from the abnormal image. A match rate is determined by comparing at least one pre-registered defect pattern and the defect pattern by the control unit.

The above-disclosed subject matter is to be considered illustrative and not restrictive, and the appended claims are intended to cover all such modifications, enhancements, and other embodiments, which fall within the true spirit and scope of the present inventive concepts. Thus, to the maximum extent allowed by law, the scope of the inventive concept is to be determined by the broadest permissible interpretation of the following claims and their equivalents, and shall not be restricted or limited by the foregoing description of the exemplary embodiments of the present inventive concepts.

Hence, the real protective scope of the inventive concept shall be determined by the technical scope of the accompanying claims.

What is claimed is:

1. An apparatus for inspecting a display panel having an insulation pattern for detects after separating the display panel having the insulation pattern from a working panel, the apparatus comprising:
   a table supporting the display panel after the separating the display panel having the insulation pattern from a working panel, the display panel including a display area on which a pixel is disposed and a non-display area on which the insulation pattern is disposed and disposed adjacent to the display area;
   a laser excitation unit irradiating the non-display area of the display panel including portions of the non-display area having the insulation pattern with a point laser beam as the display panel is supported by the table;
   a thermal wave detecting unit measuring a thermal wave generated from the non-display area based on the irradiation by the point laser beam as the display panel is supported by the table and generating a plurality of thermal wave images of portions of the non-display area irradiated by the point laser beam;
   a driving unit modifying a position of the table; and
   a control unit controlling an operation of each of the laser excitation unit, the thermal wave detecting unit, and the driving unit, the control unit detecting a crack in the insulation pattern by analyzing the plurality of thermal wave images,
   wherein a body of the table includes a groove corresponding to an edge of the display panel defined in a top surface of the body of the table the groove distributes heat generated by the point laser beam to prevent damage to the display panel.

2. The apparatus of claim 1, wherein the groove includes at least one linear area having a length of about 5 cm to about 30 cm and a width of about 700 μm to about 1300 μm.

3. The apparatus of claim 2, wherein the non-display area has a width of about 500 μm to about 1500 μm.

4. The apparatus of claim 1, wherein the groove has a closed-line shape in a plane view.

5. The apparatus of claim 1, wherein the laser excitation unit comprises a laser emitter emitting the point laser beam and a focus lens controlling a focus of the point laser beam.

6. The apparatus of claim 1, wherein the thermal wave detecting unit comprises a thermal imaging camera measuring the thermal wave and a macro lens controlling a photographing distance of the thermal imaging camera.

7. The apparatus of claim 1, wherein an image of the point laser beam, which is formed on the display panel, has a diameter or a side having a length of about 150 μm to about 500 μm.

8. The apparatus of claim 1, wherein the edge of the display panel comprises four areas, and the driving unit moves the table to irradiate the four areas of the edge with the point laser beam.

9. The apparatus of claim 1, wherein the control unit detects a crack by:
   comparing a match rate between at least one pre-registered first detect pattern comprising thermal wave images of a previously determined cracked portion and a second defect pattern acquired based on the plurality of thermal wave images, and
   when the match rate is equal to or greater than a predetermined reference value, the second defect pattern is determined as a crack of the display panel.

10. The apparatus of claim 9, wherein the control unit obtains the second defect pattern by:
   extracting thermal wave imaging data having thermal variation;
   generating an abnormal thermal wave image from the extracted thermal wave imaging data; and
   obtaining the second defect pattern from the abnormal thermal wave image.

11. The apparatus of claim 9, wherein the control unit registers the second defect pattern as a new first defect pattern if the match rate is equal to or greater than the reference value.

12. The apparatus of claim 1, further comprising a suction pump,
   wherein a suction hole extends from the top surface to a bottom surface or a side surface of the table, and
   the suction pump suctions air through the suction hole to fix the display panel to the table.

13. The apparatus of claim 11, wherein the suction hole is provided in plurality, and the plurality of suction holes are spaced a uniform distance from each other.

14. An apparatus for inspecting a display panel having an insulation pattern for detects after separating the display panel having the insulation pattern from a working panel, the apparatus comprising:
   a table supporting the display panel after the separating the display panel having the insulation pattern from a working panel, the display panel including a display area on which a pixel is disposed and a non-display area on which the insulation pattern is disposed and disposed adjacent to the display area, wherein the table includes a suction hole extending from a top surface to a bottom surface or a side surface thereof;
   a laser excitation unit irradiating the non-display area of the display panel including portions of the non-display area having the insulation pattern with a point laser beam as the display panel is supported by the table;
   a thermal wave detecting unit measuring a thermal wave generated from the non-display area based on the irradiation by the point laser beam as the display panel is supported by the table and generating a plurality of thermal wave images of portions of the non-display area irradiated by the point laser beam;
   a driving unit modifying a position of the table;
   a suction pump suctioning air through the suction hole to fix the display panel to the table; and
   a control unit controlling an operation of each of the laser excitation unit, the thermal wave detecting unit, the driving unit, and the suction pump, the control unit detecting a crack in the insulation pattern by analyzing the plurality of thermal wave images,
   wherein a body of the table includes a groove corresponding to an edge of the display panel defined in a top surface of the body of the table, the groove distributes heat generated by the point laser beam to prevent damage to the display panel.

15. The apparatus of claim 14, wherein the laser excitation unit comprises a laser emitter emitting the point laser beam and a focus lens controlling a focus of the point laser beam.

16. The apparatus of claim 14, wherein the thermal wave detecting unit comprises a thermal imaging camera measuring the thermal wave and a macro lens controlling a photographing distance of the thermal imaging camera.

17. The apparatus of claim 14, wherein an image of the point laser beam, which is formed on the display panel, has a diameter or a side having a length of about 150 μm to about 500 μm.

18. The apparatus of claim 14, wherein an edge of the display panel comprises four areas, and the driving unit moves the table to irradiate the four areas of the edge with the point laser beam.

19. The apparatus of claim 14, wherein the control unit detects a crack by:
    comparing a match rate between at least one pre-registered first defect pattern comprising thermal wave images of a previously determined cracked portion and a second defect pattern acquired based on the plurality of thermal wave images, and
    when the match rate is equal to or greater than a reference value, the second defect pattern is determined as a crack of the display panel.

20. The apparatus of claim 19, wherein the control unit registers the second defect pattern as a new first detect pattern if the match rate is equal to or greater than the reference value.

21. The apparatus of claim 14, wherein the suction hole is provided in plurality, and the plurality of suction holes are spaced a uniform distance from each other.

22. A method for inspecting a display panel for defects having an insulation pattern after separating the display panel having the insulation pattern from a working panel, comprising:
    supporting the display panel by a table after the separating the display panel having the insulation pattern from a working panel, the display panel comprising a display area on which a pixel is disposed and a non-display area disposed adjacent to the display area on which the insulation pattern is disposed;
    irradiating the non-display area of the display panel on which the insulation pattern is disposed by a laser excitation unit with a point laser beam as the display panel is supported by the table;
    measuring a thermal wave generated from the non-display area based on the irradiation by the point laser beam as the display panel is supported by the table and generating a plurality of thermal wave images of portions of the non-display area irradiated by the point laser beam by a thermal wave detecting unit;
    modifying a position of the table by a driving unit;
    controlling an operation of each of the laser excitation unit, the thermal wave detecting unit, and the driving unit by a control unit; and
    detecting a crack in the insulation pattern by the control unit by analyzing the plurality of thermal wave images,
    wherein a body of the tab includes a groove corresponding to an edge of the display panel defined in a top surface of the body of the table, the groove distributes heat generated by the point laser beam to prevent damage to the display panel.

23. The method of claim 22, wherein the control unit detects the crack by:
    comparing a match rate between at least one pre-registered first defect pattern comprising thermal wave images of a previously determined cracked portion and a second defect pattern acquired based on the plurality of thermal wave images; and
    when the match rate is equal to or greater than a predetermined reference value, the second defect pattern is determined as a crack of the display panel.

* * * * *